Patented Nov. 13, 1928.

UNITED STATES PATENT OFFICE.

FRITZ DOERINCKEL AND MARTIN SCHLIEMANN, OF LEVERKUSEN, NEAR COLOGNE-ON-THE-RHINE, GERMANY, ASSIGNORS TO I. G. FARBENINDUSTRIE AKTIENGESELLSCHAFT, OF FRANKFORT-ON-THE-MAIN, GERMANY.

PROCESS FOR THE PREPARATION OF ANHYDRIDES OF ORGANIC ACIDS.

No Drawing. Application filed January 21, 1927, Serial No. 162,675, and in Germany January 28, 1926.

This invention relates to a new and improved process for the preparation of organic acid anhydrides.

The well-known method of preparing organic acid anhydrides consists in causing an organic acid chloride to react with a salt of an organic acid. In commercial practice the acid chloride is not actually used as such, but is formed as an intermediate product and is caused to react in the nascent state with the salt. Due to the high vapor pressure which the acid chlorides possess even at ordinary temperatures, and due to the comparatively high heat of formation of the metal chlorides which result from the reaction of the acid chloride with the organic acid salt, it is necessary to take special precautions in order to minimize losses in yield. A further difficulty which resides in this process is due to the sluggishness of the reaction between the acid chloride and the salt, and for this reason a portion of the raw materials escapes conversion into the desired anhydride. In this process of producing anhydrides there are formed compounds such as compounds of organic acids with the anhydrides of sulfuric and phosphoric acid and similar acid anhydrides, which compounds are unstable and are very likely to decompose. In the presence of such substances it is impossible to employ high temperatures during the distillation of the anhydride, and it frequently becomes necessary to carry out the distillation under reduced pressure, and under reduced pressure very great difficulties are encountered in the recovery of unattacked acid chloride.

It has also been proposed to carry out the reaction between a salt and an acid chloride in the presence of acetic acid. Such a process avoids some of the above-mentioned difficulties, but the formation of organic compounds of sulfuric acid and phosphoric acid is not prevented, and when this process is carried out on a commercial scale the yields obtained are not the best.

A further process of preparing organic acid anhydrides has been proposed, in which sulphur chloride is used as a carrier for chlorine. However, this process is not satisfactory because of the unavoidable formation of sulphurized organic compounds of the anhydrides, which, due to their odor, preclude the use of the anhydrides for almost all purposes.

The process of the present invention overcomes substantially all of the difficulties above mentioned and makes it possible to obtain nearly theoretical yields. It consists in reacting a mixture of an organic acid salt, a free organic acid and chlorides of elements of the group including silicon, titanium and tin. It is merely necessary to mix the organic acid salt, the free organic acid and the chloride at room temperature and the reaction proceeds rapidly. Preferably the tetrachlorides of silicon, titanium and tin are used, and more especially the tetrachloride of silicon. The chlorides of silicon and titanium may be used alone or in any desired mixture. Tin chloride, when used alone, does not give as satisfactory yields as the chlorides of the other metals, but when it is used in admixture with one or both of the chlorides of silicon and titanium, it does not lower the efficiency of the reaction. Moreover, due to the high price of tin chloride, it would probably not be used except where the presence of tin dioxide is desired in the resulting by-products.

At the end of the reaction, the mixture of anhydride and organic acid is distilled and the two are separated by well-known methods. Instead of using the free organic acid, the first fraction resulting from the distillation of the mixture of anhydride and organic acid may be used.

The use of chlorides such as chlorides of silicon, titanium and tin in accordance with this invention avoids losses due to the decomposition of the afore-mentioned compounds of sulfuric and phosphoric acid anhydrides.

The process of the present invention is applicable to the production of any desired organic acid anhydrides, simple or mixed. The following specific example illustrates the manner in which acetic acid anhydride is formed:

About 100 parts by weight of glacial acetic acid are added to 328 parts by weight of dry sodium acetate in a closed reaction vessel. While stirring, 170 parts by weight of silicon tetrachloride are introduced at room temperature. Due to the heat of reaction a rise in temperature results and a certain amount of over pressure becomes noticeable. The reaction is considered terminated when the pressure has become normal again. The reaction vessel is then heated and the mixture of acetic acid anhydride and acetic acid is distilled in the customary manner, preferably under reduced pressure. The acid and anhydride are separated in accordance with well-known methods. The yield amounts to 200 parts by weight of acetic acid anhydride, which corresponds to 98% of the theoretical yield.

Instead of using glacial acetic acid, as described above, the first fraction which results from the distillation of the mixture of acetic acid anhydride and acetic acid may be employed. The amount of added acetic acid or of the first fraction of the distillation referred to may vary within very wide limits without in any way injuriously affecting the yield. Even very small additions of acetic acid as such or in the form of the distillate referred to cause a very noticeable increase in the velocity of the reaction.

However, any considerable deviation in the proportion of sodium acetate to the proportion of silicon tetrachloride tends to lower the yield.

The velocity of the reaction may be favorably influenced by replacing part of the silicon tetrachloride by stannic chloride and titanic chloride, or a mixture of these, in which case small quantities of the last-named chlorides will suffice. Suitable mixtures of these chlorides are indicated in the following table, but it is to be understood that these chlorides may be used in other proportions or alone without departing from the spirit of this invention.

| | | | |
|---|---|---|---|
| $SiCl_4$ | 161.5 parts | or 161.5 parts | or 161.5 parts |
| $TiCl_4$ | 9.5 parts | | 4.75 parts |
| $SnCl_4$ | | 13.0 parts | or 6.5 parts |

The example given above illustrates the production of acetic acid anhydride, but it is to be understood that the process is applicable to the production of homologues and derivatives of acetic acid anhydride, such as, for example, the anhydride of propionic acid. If it is desired to produce mixed anhydrides, it is only necessary to use a mixture of sodium salts of different organic acids. For example, a mixture of sodium acetate with sodium propionate or a mixture of sodium salts of any other organic acids may be used.

The reaction which probably takes place in the formation of acid anhydrides according to the invention may be indicated as follows in the case of silicon tetrachloride:

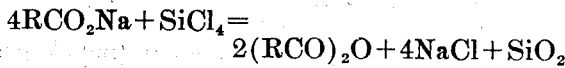

$$4RCO_2Na + SiCl_4 = 2(RCO)_2O + 4NaCl + SiO_2$$

In the case of mixed anhydrides the reaction probably proceeds in accordance with the following equation:

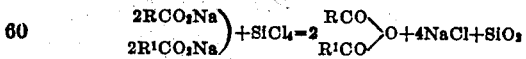

The addition of free organic acids increases the velocity of the reaction and increases the yield. At the end of the reaction the free acid is recovered, unchanged. It therefore probably functions as a solvent and perhaps also as a catalyst. Although an attempt has been made to explain the mechanism of the reaction, it is to be understood that the invention is not limited thereby.

The time required for the reaction between the organic salt and the silicon tetrachloride is very definite, although it is very short. The equations given above indicate that sodium chloride and silicon dioxide are probably formed while some silicon tetrachloride, which has not yet reacted, is present. The heat of formation of the sodium chloride and of the silicon dioxide causes the silicon tetrachloride to vaporize, and also some of the acetyl chloride which is formed as an intermediate product, and in this way the over pressure which is noticeable in the reaction vessel is accounted for. The further the reaction proceeds the lower the pressure falls and the end of the reaction is indicated when the pressure has become normal again. It is therefore apparent that the rise and fall in pressure are both caused by the reaction itself.

We claim:

1. Process of preparing organic acid anhydrides, which comprises reacting a mixture containing the corresponding organic acid salt, a free organic acid, and a chloride of an element of the group including silicon, titanium and tin, and separating the anhydride produced.

2. Process of preparing organic acid anhydrides, which comprises reacting a mixture containing the corresponding organic acid salt, a free organic acid, and a tetrachloride of an element of the group including silicon, titanium and tin, and separating the anhydride produced.

3. Process of preparing organic acid anhydrides, which comprises reacting a mixture containing the corresponding organic acid salt, a free organic acid, and silicon tetrachloride, and separating the anhydride produced.

4. Process of preparing organic acid anhydrides, which comprises reacting a mixture containing the corresponding organic acid salt, a free organic acid, and the tetrachlorides of silicon, titanium and tin, and separating the anhydride produced.

5. Process of preparing organic acid anhydrides, which comprises reacting a mixture containing the corresponding organic acid salt, a free organic acid, and two or more of the tetrachlorides of silicon, titanium and tin, and separating the anhydride produced.

6. Process of preparing organic acid anhydrides, which comprises reacting a mixture containing the corresponding organic acid salt, a free organic acid, and the tetrachlorides of silicon and titanium, and separating the anhydride produced.

7. Process of preparing organic acid anhydrides, which comprises reacting a mixture containing the corresponding organic acid salt, a free organic acid, and the tetrachlorides of silicon and tin, and separating the anhydride produced.

8. Process of preparing organic acid anhydrides, which comprises reacting a mixture containing the corresponding organic acid salt, a free organic acid, and a chloride of an element of the group including silicon, titanium and tin, the organic acid salt and the chloride being present in the proportion of 4 molecular weights to 1 molecular weight, and separating the anhydride produced.

9. Process of preparing acetic acid anhydride, which comprises reacting a mixture containing a salt of acetic acid, acetic acid, and a chloride of an element of the group including silicon, titanium and tin, and separating the anhydride produced.

10. Process of preparing acetic acid anhydride, which comprises reacting a mixture containing a salt of acetic acid, acetic acid, and a tetrachloride of an element of the group including silicon, titanium and tin, and separating the anhydride produced.

11. Process of preparing acetic acid anhydride, which comprises reacting a mixture containing a salt of acetic acid, acetic acid, and silicon tetrachloride, and separating the anhydride produced.

12. Process of preparing acetic acid anhydride, which comprises reacting a mixture containing a salt of acetic acid, acetic acid, and the tetrachlorides of silicon, titanium and tin, and separating the anhydride produced.

13. Process of preparing acetic acid anhydride, which comprises reacting a mixture containing a salt of acetic acid, acetic acid, and two or more of the tetrachlorides of silicon, titanium and tin, and separating the anhydride produced.

14. Process of preparing acetic acid anhydride, which comprises reacting a mixture containing a salt of acetic acid, acetic acid, and the tetrachlorides of silicon and titanium, and separating the anhydride produced.

15. Process of preparing acetic acid anhydride, which comprises reacting a mixture containing a salt of acetic acid, acetic acid, and the tetrachlorides of silicon and tin, and separating the anhydride produced.

16. Process of preparing acetic acid anhydride, which comprises reacting a mixture containing a salt of acetic acid, acetic acid, and a chloride of an element of the group including silicon, titanium and tin, the acetic acid salt and the chloride being present in the proportion of 4 molecular weights to 1 molecular weight, and separating the anhydride produced.

In testimony whereof, we affix our signatures.

FRITZ DOERINCKEL.
MARTIN SCHLIEMANN.